United States Patent
Vikman et al.

(12)

(10) Patent No.: US 8,856,224 B2
(45) Date of Patent: Oct. 7, 2014

(54) IMPLEMENTING A MULTI-USER COMMUNICATIONS SERVICE

(75) Inventors: Tuija Vikman, Lempaala (FI); Tahvo Hyotylainen, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1204 days.

(21) Appl. No.: 11/713,703

(22) Filed: Mar. 5, 2007

(65) Prior Publication Data

US 2008/0222247 A1    Sep. 11, 2008

(51) Int. Cl.
| | |
|---|---|
| G06F 15/16 | (2006.01) |
| H04L 29/08 | (2006.01) |
| H04L 12/66 | (2006.01) |
| H04L 12/58 | (2006.01) |
| H04W 8/18 | (2009.01) |
| H04L 29/06 | (2006.01) |
| H04W 76/00 | (2009.01) |

(52) U.S. Cl.
CPC ............ H04L 12/66 (2013.01); H04L 67/14 (2013.01); H04L 67/38 (2013.01); H04L 67/306 (2013.01); H04W 76/005 (2013.01); H04L 51/18 (2013.01); H04L 67/34 (2013.01); H04L 51/38 (2013.01); H04W 8/18 (2013.01)
USPC .......................................... 709/204; 709/220

(58) Field of Classification Search
CPC .......... H04L 67/34; H04L 51/18; H04L 51/38
USPC ........... 709/204–207, 227–229, 220; 455/466
See application file for complete search history.

(56) References Cited

U.S. PATENT DOCUMENTS

| | | | |
|---|---|---|---|
| 6,714,793 B1* | 3/2004 | Carey et al. ................... 455/466 |
| 7,058,036 B1* | 6/2006 | Yu et al. ......................... 370/335 |
| 7,124,123 B1* | 10/2006 | Roskind et al. ................. 706/60 |
| 7,548,756 B2* | 6/2009 | Velthuis et al. ............... 455/466 |
| 7,860,525 B2* | 12/2010 | Parkkinen et al. ............ 455/518 |
| 7,867,094 B1* | 1/2011 | Wisdom et al. ................. 463/43 |
| 2002/0165000 A1* | 11/2002 | Fok .............................. 455/466 |
| 2004/0103153 A1* | 5/2004 | Chang et al. .................. 709/206 |
| 2004/0117458 A1* | 6/2004 | Tominaga ..................... 709/217 |
| 2008/0040461 A1* | 2/2008 | Kumbalimutt et al. ....... 709/221 |
| 2008/0043723 A1* | 2/2008 | Lindgren et al. ............. 370/352 |
| 2008/0090598 A1* | 4/2008 | Fanelli et al. ................. 455/466 |
| 2008/0096507 A1* | 4/2008 | Erola ......................... 455/187.1 |
| 2008/0189293 A1* | 8/2008 | Strandel et al. ................. 707/10 |
| 2008/0301237 A1* | 12/2008 | Parsons et al. ................ 709/206 |
| 2009/0221307 A1* | 9/2009 | Wolak et al. .................. 455/466 |
| 2009/0234922 A1* | 9/2009 | Appelman .................... 709/206 |
| 2010/0042717 A1* | 2/2010 | Strandell et al. ............. 709/224 |
| 2012/0221689 A1* | 8/2012 | Qian et al. .................... 709/220 |

* cited by examiner

*Primary Examiner* — Joseph E Avellino
*Assistant Examiner* — James Conaway
(74) *Attorney, Agent, or Firm* — Ziegler IP Law Group (57) ABSTRACT

A method of implementing an optional communications service within a communications system that involves the participation of a plurality of users of the communications system. The method includes, in response to an action by a first user of the communications system, initiating the preparation of one or more elements of the communications system for providing said optional communications service in relation to one or more other existing users of the communications system. When the first user thereafter accesses the optional communications service, the communications system is already prepared for participation by said one or more other existing users in the optional communications service.

16 Claims, 5 Drawing Sheets

IMPLEMENTING A MULTI-USER COMMUNICATIONS SERVICE

FIELD OF THE INVENTION

The present invention relates to a technique for implementing an optional communications service within a communications system involving the participation of a plurality of users.

BACKGROUND OF THE INVENTION

Group calls, instant messaging, interactive gaming and Push-to talk over Cellular (PoC) are examples of optional communications services that may be provided by a communications system, and which involve the participation of a plurality of users of the communications system. Subscriptions by users of the communications system to such optional communications services are conventionally achieved only by separate individual requests from the users through a customer care facility or a self-service portal. The inventors have identified the problem that one user wishing to participate in such an optional communications service with another user depends on such another user already having made its own individual request for subscription to the service, and that this can lead to the service not being used as effectively as possible.

SUMMARY OF THE INVENTION

It is an aim of the present invention to provide a new technique for implementing an optional multi-user communications service within a communications system that facilitates more effective usage of the optional multi-user communications service.

According to one aspect of the present invention, there is provided a method of implementing an optional communications service within a communications system involving the participation of a plurality of users of the communications system, the method including: in response to an action by a first user of the communications system, initiating the preparation of one or more elements of the communication system for providing said optional communications service in relation to one or more other existing users of the communications system, such that when the first user thereafter accesses the optional communication service, the communications system is already prepared for participation by said one or more other existing users in the optional communication service.

In one embodiment, the optional communications service is selected from the group consisting of: an instant messaging service, an interactive gaming service and a push to talk over cellular (PoC) service.

In one embodiment, said preparation includes collecting service subscription data for said one or more other existing users at one or more network elements.

In one embodiment, said one or more elements of the communications system include one or more existing user terminals of said communications system for said one or more other existing users of the communications system, and said preparation includes configuring the settings of said one or more existing user terminals.

In one embodiment, the one or more other existing users of the communication system are a selected user or a selected group of users associated with the first user, such as one or more other existing users identified in a personal contact list for the first user.

In one embodiment, said action by the first user comprises making a request for subscription of said first user to said optional communications service, or comprises making a request to add one or more additional existing users of the communications system to said personal contact list for the first user.

In one embodiment, said preparation includes: obtaining the first user's authority for preparation of one or more elements of the communications system for providing said optional communications service for said one or more other existing users of the communications system.

In one embodiment, said preparation includes identifying said one or more other existing users from a personal contact list for the first user.

In one embodiment, said one or more elements of the communications system include one or more databases.

According to another aspect of the present invention, there is provided a method including: in response to an action by a first user of a communications system, requesting said first user for the authority thereof to prepare one or more elements of the communications system for providing an optional communications service in relation to one or more other existing users of the communications system, such that when the first user thereafter accesses the optional communication service, the communications system is already prepared for participation by said one or more other existing users in the optional communication service.

According to another aspect of the present invention, there is provided a communications system for implementing an optional communications service involving the participation of a plurality of users of the communications system, wherein the system is configured to: in response to an action by a first user of the communications system, initiate the preparation of one or more elements of the communication system for providing said optional communications service for one or more other existing users of the communications system, such that when the first user thereafter accesses the optional communication service, the communications system is already prepared for participation by said one or more other existing users in the optional communication service.

According to another aspect of the present invention, there is provided a communications system for implementing an optional communications service involving the participation of a plurality of users of the communications system, wherein the system is configured to: in response to an action by a first user of a communications system, request said first user for the authority thereof to prepare one or more elements of the communications system for providing the optional communications service for one or more other existing users of the communications system, such that when the first user thereafter accesses the optional communication service, the communications system is already prepared for participation by said one or more other existing users in the optional communication network service.

According to another aspect of the present invention, there is provided a communications system for implementing an optional communications service involving the participation of a plurality of users of the communications system, wherein the system includes: means for initiating, in response to an action by a first user of the communications system, the preparation of one or more elements of the communication system for providing said optional communications service for one or more other existing users of the communications system, such that when the first user thereafter accesses the optional communication service, the communications system is already prepared for participation by said one or more other existing users in the optional communication service.

According to another aspect of the present invention, there is provided a communications system for implementing an optional communications service involving the participation of a plurality of users of the communications system, wherein the system includes: means for requesting, in response to an action by a first user of a communications system, said first user for the authority thereof to prepare one or more elements of the communications system for providing the optional communications service for one or more other existing users of the communications system, such that when the first user thereafter accesses the optional communication service, the communications system is already prepared for participation by said one or more other existing users in the optional communication network service.

DETAILED DESCRIPTION OF EMBODIMENTS OF THE INVENTION

Embodiments of the invention are described hereunder, by way of non-limiting example only, with reference to the accompanying drawings.

Figure 1:
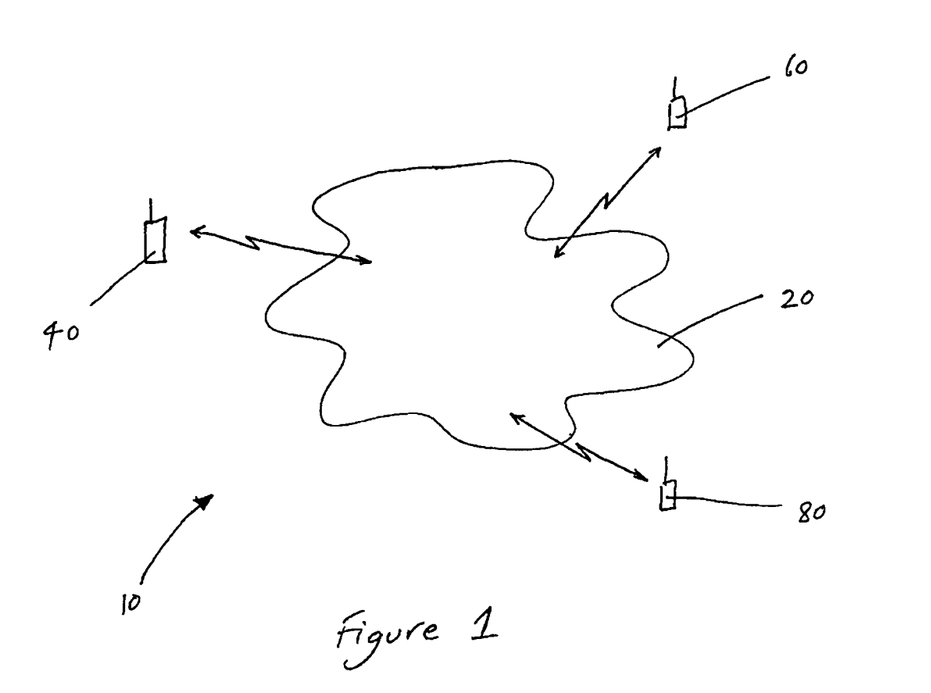
FIG. 1 illustrates an example of a communications service within which an embodiment of the present invention is implemented.

FIG. 1 illustrates an example of a communications system 1 in which embodiments of the invention are implemented. In FIG. 1, a plurality of user terminals 40, 60 and 80 (typically, many more than three user terminals would form part of the communications system 10, but only three are shown for the purpose of explaining embodiments of the invention) are connected to a communications network 20 via respective wireless interfaces. The communications network 20 may itself comprise a plurality of sub-networks including one or more radio access networks. The network 20 may provide a number of basic services such as standard calls between two user terminals, and may also provide one or more optional communication services such as group calls, instant messaging, interactive gaming and PoC services, which each require a special subscription and which each involve the participation of a plurality of users of the communications system.

Figure 4:
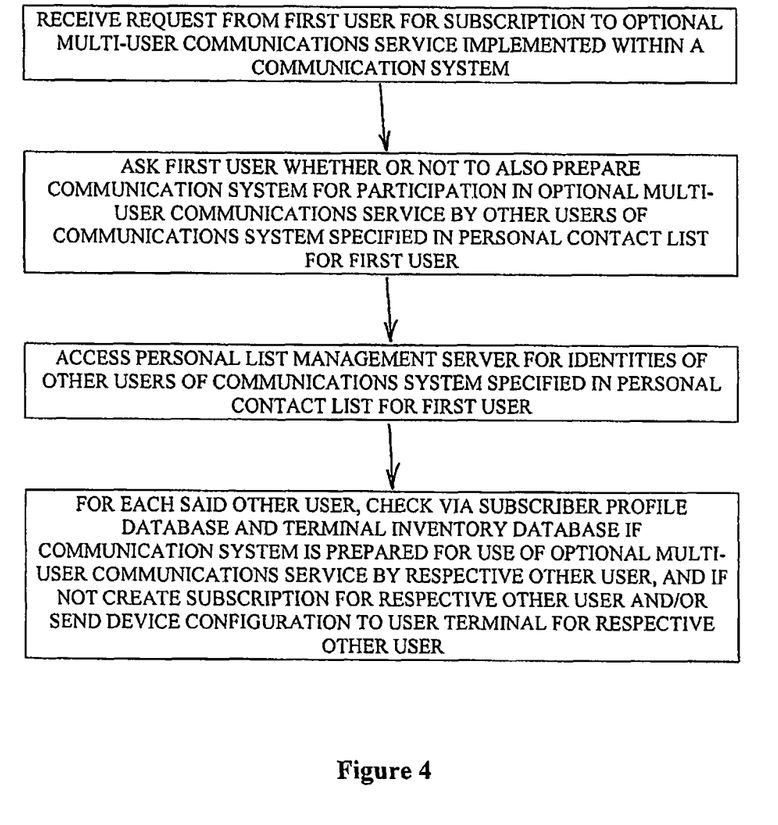
FIG. 4 illustrates a method according to an embodiment of the present invention.

According to a first embodiment of the present invention as illustrated in FIG. 4, the creation of a subscription to an optional multi-user communications service for a first subscriber/user A of the communications system 10 prompts the creation of subscriptions to the same optional multi-user communications service for one or more other existing subscribers/users of the communications system 10.

User/subscriber A is prompted by a message to user terminal 40 asking whether Subscriber A wants those other subscribers/users of the communication system included in his/her personal list (which are also referred to in this specification as "buddies") to also be provisioned for said optional multi-user communications service. If the answer to this question is yes, the provisioning system makes a query to the list management server that holds and maintains the personal lists for subscriber/user A, retrieves the identities and checks via a subscriber profile database and a terminal inventory database if each such other user/subscriber is already a subscriber to said optional multi-user optional communications system.

For each of said other subscribers/users for which the result of the check is negative, the provisioning system then creates subscriptions and sends any required device configurations to the respective user terminal devices 60, 80, and sends a notification to the user terminal device 40 for Subscriber A so that Subscriber A knows that he/she can start using said multi-user communications service together with his/her buddies.

The provisioning system does not need to hold or maintain the personal contact list for subscriber A; it could request the user terminal device 4 associated with subscriber A for details of the identities of the other users/subscribers lists in the personal list for subscriber A.

Figure 2:
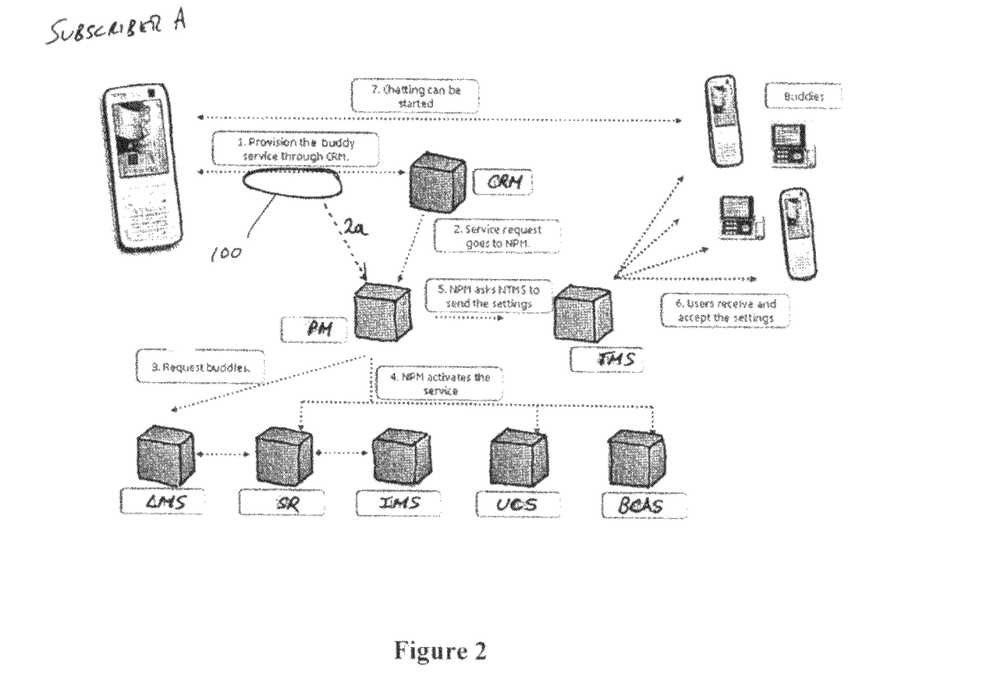
FIGS. 2 and 3 illustrate an example of a set of communications system elements and the interfaces therebetween for implementing an embodiment of the present invention.
Figure 3:
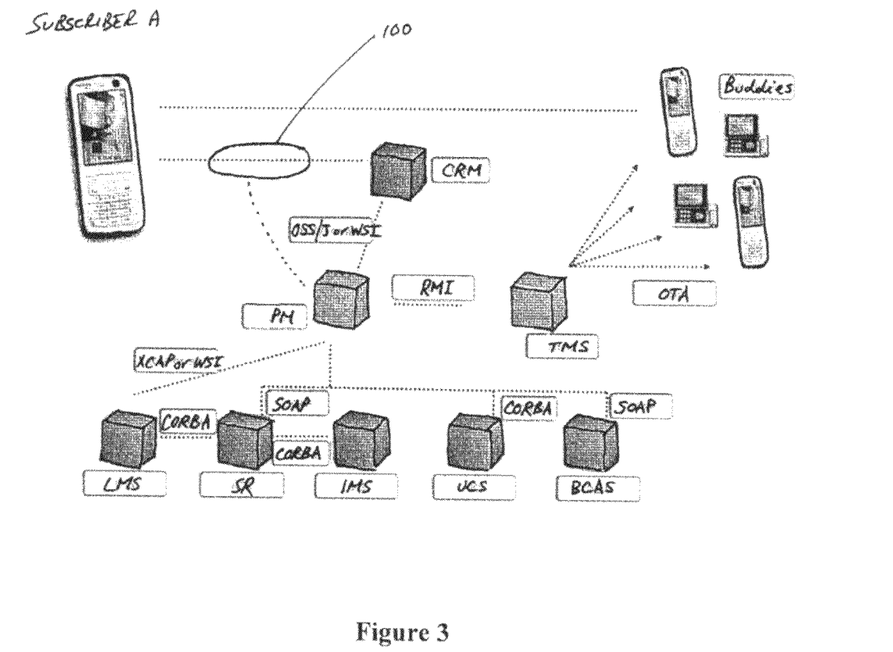

An example of a set of communication system elements for implementing the creation of subscriptions for other users/subscribers in the embodiment of FIG. 4 is illustrated in FIGS. 2 and 3. FIG. 2 illustrates the order of actions/notifications between the system elements, and FIG. 3 identifies the type of the interfaces between the system elements.

In FIGS. 2 and 3, the following abbreviations are used:
PM: Profile Manager
TMS: Terminal Management Server
CRM: Customer Relationship Management
SR: Subscriber Repository (such as a Home Location Register (HLR))
IMS: IP Multimedia Subsystem
LMS: List management Server
UCS: Unified Charging Solution
BCAS: Business Communication Application Server
OSS/J: Operating Supporting System java interface
RMI: Remote Method Invocation
WSI: Web Service Interface
SOAP: Simple Object Access Protocol
CORBA: Common Object Request Broker Architecture
OTA: Over The Air technology
XCAP: XML Configuration Access Protocol;
XML: Extended Markup Language The combination of the PM and TMS is referred to as an Integrated Provisioning Solution (IPS), and it takes care of the notification, subscription and terminal configuration of subscriber A and his/her buddies. The IPS always ensures that it is allowed to create a subscription and set the terminal configuration for each buddy retrieved or obtained from list management server based on the respective subscriber profile and respective device inventory.

The interaction between the system elements shown in FIGS. 2 and 3 is described below for the example of a chat service.

In response to subscriber A subscribing to the chat service, CRM starts the creation of buddy subscriptions for the chat service after obtaining authority from subscriber A to do so (Step 1 in FIG. 2).

A subscription creation request is routed from the CRM to the PM (Step 2 in FIG. 2).

According to one variation, a service/access network 100 (a sub-network of network 20) associated with subscriber A directly contacts the PM to request the creation of buddy subscriptions (Step 2a in FIG. 2). In one example, the CRM gives the IPS advance general authorisation to act on any such direct request from the service/access network 100. In another example, the IPS may automatically make a request to the CRM as to whether there are one or more conditions that need to be met before the buddy subscriptions can be created. Either the service/access network 100 or the IPS can then prompt the subscriber A for specific authorisation if any such conditions are set. Alternatively, general authorisation is given in advance as part of the basic contract between Subscriber A and the provider/operator of the communications system, and which general authorisation is used when Subscriber A subscribes to the chat service, or (in the case of the second embodiment described below) adds one or more additional subscribers/users of the communications system to his/her personal contact list. With this variation, the participation of the CRM and/or subscriber A can be reduced.

When the PM starts the automated provisioning for the buddies, it first obtains from LMS identities of those other users/subscribers of the communication system included in the personal contact list for subscriber A, i.e. the buddies of subscriber A (Step 3 in FIG. 2). The PM then initiates preparation of the SR, UCS and BCAS by the addition to the databases thereof of any required subscriber information for providing the chat service for the buddies of subscriber A (Step 4 in FIG. 2).

The PM also ensures that the user terminals for the buddies of subscriber A have the correct settings. The correct terminal settings are sent to the buddies as a configuration message (SMS message) from the Terminal Management Server (TMS) (Step 5 in FIG. 2). The user terminals receive the correct settings (Step 6 in FIG. 2) and send an acceptance message in reply, where the protocol and/or terminals so require.

Subscriber A is notified by SMS when the buddies are properly provisioned and configured (not shown in FIG. 2). Subscriber A is then able to use the chat service with his or her buddies (Step 7 in FIG. 2).

Figure 5:
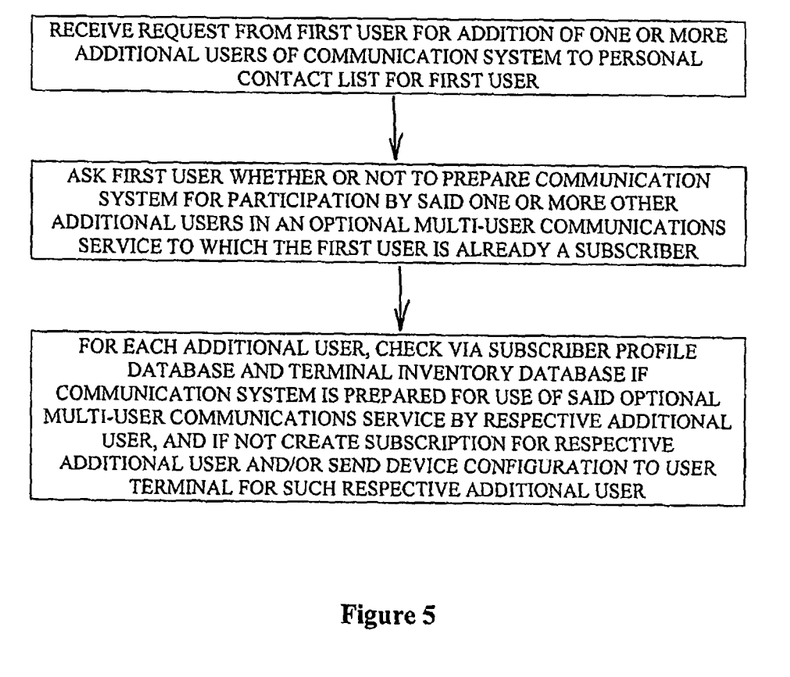
FIG. 5 illustrates a method according to another embodiment of the present invention.

According to a second embodiment illustrated in FIG. 5, a request by subscriber A for the addition to his/her personal contact list of one or more additional users/subscribers to the communications system prompts the creation of a subscription for such one or more additional users to any optional multi-user communications service for which the subscriber/user A is already a subscriber. With this embodiment, subscriber A also has the possibility to refresh the provisioning of buddies when subscriber A modifies its personal contact list, which personal contact list may be maintained at a list management server (LMS).

With the above-described embodiments of the present invention, the probability for user satisfaction and effective usage of the service is increased because there is less risk that the other users in the personal contact list of subscriber A (e.g. friends, family etc.) will not be able to participate in the service because of insufficient subscription data in the network or incorrect device configuration.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

What is claimed is:

1. A method, comprising:
   in response to an action by a first user of a communications system, the action comprising selecting one or more other existing users associated with the first user from a personal list to include the one or more other existing users in an optional communications service involving participation of a plurality of users to which the first user has subscribed,
   determining whether any of the one or more other existing users are already a subscriber to said optional communications service;
   automatically initiating a preparation of one or more elements of the communications system to provide the optional communications service to the one or more other existing users of the communications system that are determined not to be a subscriber to said optional communications service, such that when the first user thereafter accesses the optional communications service, the communications system is already prepared for said one or more other existing users to participate in the optional communications service,
   wherein the communications system creates a subscription to the optional communications service for each of the one or more other existing users that lacks a subscription; and
   transmitting configuration information to the one or more other existing users to configure user terminals of the one or more other existing users to enable access to said optional communications service.

2. A method according to claim 1, wherein the optional communications service comprises one of an instant messaging service, an interactive gaming service and a push to talk over cellular service.

3. A method according to claim 1, wherein said preparation includes collecting service subscription data for said one or more other existing users at one or more network elements.

4. A method according to claim 1, wherein the one or more other existing users are identified in a personal contact list for the first user.

5. A method according to claim 1, wherein said action by the first user comprises making a request for subscription of said first user to said optional communications service.

6. A method according to claim 4, wherein said action by the first user includes making a request to add one or more additional existing users of the communications system to said personal contact list for the first user.

7. A method according to claim 1, wherein said preparation further comprises obtaining the first user's authority to prepare one or more elements of the communications system to provide said optional communications service for said one or more other existing users of the communications system.

8. A method according to claim 1, wherein said preparation includes identifying said one or more other existing users from a personal contact list for the first user.

9. A method according to claim 1, wherein said one or more elements of the communications system comprises one or more databases.

10. A method, comprising:
    in response to an action by a first user of a communications system, the action comprising selecting one or more other existing users associated with the first user from a personal list to include the one or more other existing users in an optional communications service involving participation of a plurality of users to which the first user has subscribed, requesting permission from the first user to prepare one or more elements of the communications system to provide an optional communications service in relation to one or more other existing users of the communications system, such that when the first user thereafter accesses the optional communications service, the communications system is already prepared for said one or more other existing users to participate in the optional communications service;
    in response to receiving the permission from the first user, determining whether any of the one or more other existing users are already a subscriber to the optional communications service;

the communications system automatically creating a subscription to the optional communications service for each of the one or more other existing users that lacks a subscription; and sending configuration information to the one or more other existing users to configure user terminals of the one or more other existing users to enable access to said optional communications service.

11. a method, comprising:

requesting, by a terminal of a first user, a subscription to an optional multi-user communications service involving participation of a plurality of users implemented within a communications system;

receiving, by the terminal, an inquiry from the communications system whether to prepare the communication system for one or more other existing users to participate in an optional multi-user communications service, wherein the one or more other existing users are associated with the first user and are selected from a personal list of the first user; and responding, by the terminal, to the inquiry, wherein when the terminal responds affirmatively to the inquiry, the communications system is prompted to determine whether any of the one or more other existing users are already a subscriber to said optional communications service to which the first user has subscribed, to automatically initiate a preparation of one or more elements of the communications system to provide the optional communications service for one or more existing users of the communications system that have been determined not to be a subscriber to said optional communications service, wherein the communications system is prompted to create a subscription to the optional communications service for each of the one or more existing users that lacks a subscription when the terminal responds affirmatively, and to send configuration information to the one or more other existing users to configure user terminals of the one or more other existing users to enable access to said optional communications service.

12. A method according to claim 11, wherein the optional communications service comprises one of an instant messaging service, an interactive gaming service and a push to talk over cellular service.

13. A method according to claim 11, further comprising:

making a request, by the terminal, to add one or more additional existing users of the communications system to a personal contact list for the first user.

14. An apparatus, comprising:

at least one processor and at least one memory including computer program code, the at least one memory and the computer program code configured to, with the at least one processor, cause the apparatus at least to perform:

requesting a subscription for a first user to an optional multi-user communications service involving participation of a plurality of users implemented within a communications system;

receiving an inquiry from the communications system whether to prepare the communication system for one or more other existing users to participate in the optional multi-user communications service to which the first user has subscribed, wherein the one or more other existing users are associated with the first user and are selected from a personal list of the first user; and responding to the inquiry, wherein when the apparatus responds affirmatively to the inquiry, the communications system is prompted to determine whether any of the one or more other existing users are already a subscriber to said optional communications service to automatically prepare one or more elements of the communications system to provide the optional communications service for one or more existing users of the communications system that have been determined not to be a subscriber to said optional communications service, to create a subscription to the optional communications service for each of the one or more existing users that lacks a subscription when the apparatus responds affirmatively, and to send configuration information to the one or more other existing users to configure user terminals of the one or more other existing users to enable access to said optional communications service.

15. An apparatus according to claim 14, wherein the optional communications service comprises one of an instant messaging service, an interactive gaming service and a push to talk over cellular service.

16. An apparatus according to claim 14, wherein the at least one memory and the computer program code are further configured to, with the at least one processor, cause the apparatus at least to make a request to add one or more additional existing users of the communications system to a personal contact list for the first user.

* * * * *

UNITED STATES PATENT AND TRADEMARK OFFICE
CERTIFICATE OF CORRECTION

| | | |
|---|---|---|
| PATENT NO. | : 8,856,224 B2 | |
| APPLICATION NO. | : 11/713703 | |
| DATED | : October 7, 2014 | |
| INVENTOR(S) | : Tuija Paula Tuulia Vikman et al. | |

It is certified that error appears in the above-identified patent and that said Letters Patent is hereby corrected as shown below:

In the claims

Claim 11, Column 7, Line 9, is to be amended by replacing the first word of the claim [[a]] with A.

Should read

11. [[a]] A method according to claim 1, wherein said one or more elements of the communications system comprises one or more databases.

Signed and Sealed this
Sixth Day of October, 2015

Michelle K. Lee
*Director of the United States Patent and Trademark Office*